US009415742B1

(12) United States Patent
Sasakura et al.

(10) Patent No.: US 9,415,742 B1
(45) Date of Patent: Aug. 16, 2016

(54) THREE-WAY GAS GUIDE (71) Applicant: Autoliv ASP, Inc., Ogden, UT (US)

(72) Inventors: Hiroki Sasakura, Roy, UT (US);
Xiaohong Wang, Roy, UT (US);
Takayuki Makioka, Roy, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/716,115

(22) Filed: May 19, 2015

(51) Int. Cl.
*B60R 21/16* (2006.01)
*B60R 21/261* (2011.01)
*B60R 21/232* (2011.01)

(52) U.S. Cl.
CPC ............. *B60R 21/261* (2013.01); *B60R 21/232* (2013.01); *B60R 2021/2612* (2013.01)

(58) Field of Classification Search
USPC .............................. 280/730.1, 730.2, 739, 742
See application file for complete search history.

(56) References Cited

U.S. PATENT DOCUMENTS

| 6,293,581 | B1 * | 9/2001 | Saita ..................... B60R 21/213 280/730.2 |
| 6,811,184 | B2 * | 11/2004 | Ikeda .................... B60R 21/232 280/730.2 |
| 7,404,572 | B2 * | 7/2008 | Salmo .................... B60R 21/232 280/729 |
| 7,597,348 | B2 * | 10/2009 | Fukuda ................. B60R 21/233 280/730.2 |
| 7,775,551 | B2 * | 8/2010 | Bowers .................. B60R 21/232 280/729 |
| 7,883,112 | B2 | 2/2011 | Wold et al. |
| 7,909,356 | B2 * | 3/2011 | Ilda ........................ B60R 21/214 280/728.2 |
| 8,006,999 | B2 * | 8/2011 | Suemitsu ............ B60R 21/2346 280/728.2 |
| 8,668,224 | B2 * | 3/2014 | Taniguchi ............. B60R 21/232 137/855 |
| 8,727,376 | B2 * | 5/2014 | Goto ..................... B60R 21/262 280/730.2 |
| 9,205,801 | B2 * | 12/2015 | Osterfeld .............. B60R 21/262 |
| 2003/0218324 | A1 * | 11/2003 | Ju ........................... B60R 21/26 280/743.1 |
| 2007/0035115 | A1 * | 2/2007 | Kim ...................... B60R 21/232 280/742 |
| 2008/0224457 | A1 * | 9/2008 | Brough ................. B60R 21/232 280/730.2 |
| 2014/0239620 | A1 * | 8/2014 | Kawamura ........... B60R 21/213 280/730.2 |
| 2014/0306435 | A1 * | 10/2014 | Lee ....................... B60R 21/261 280/742 |

* cited by examiner

Primary Examiner — Toan To
(74) Attorney, Agent, or Firm — Stoel Rives LLP (57) ABSTRACT Gas guides or airbag assemblies including gas guides are disclosed. The gas guides can direct inflation gas within an inflatable cushion. The gas guides can include a forward opening that delivers inflation gas to a forward portion of an inflatable cushion and a rearward opening that delivers inflation gas to a rearward portion of an inflatable cushion. The gas guides can further include a downward opening that delivers inflation gas downward to a lower portion of an inflatable cushion. The area of the downward opening can be greater than the areas of the forward opening or the rearward opening such that a greater portion of the inflation gas is directed downward into the inflatable cushion.

23 Claims, 6 Drawing Sheets

THREE-WAY GAS GUIDE

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize vehicle occupant injury during collision events. Airbag modules have been installed at various locations within a vehicle, including, but not limited to, within the steering wheel, within the dashboard and/or instrument panel, within the side doors or side seats, adjacent to a roof rail of the vehicle, in an overhead position, or at the knee or leg position. In the following disclosure, "airbag" generally refers to an inflatable curtain airbag or cushion, although the principles discussed may apply to other types of airbags (e.g., driver airbags and knee airbags).

Inflatable curtain airbags typically extend longitudinally within the vehicle and are usually coupled to or next to the roof rail of the vehicle. In a packaged state or an undeployed state, inflatable curtain cushions are typically rolled and/or folded, and may be retained in the packaged configuration or the undeployed configuration by being wrapped in a restraint at various attachment points at which the inflatable airbag is attached to the vehicle, or by being enclosed in a restraint, such as a sleeve or a sock. In a deployed state or an unpackaged state, an inflatable curtain cushion may expand and burst free from the restraint to cover at least a portion of the side windows and one or more pillars of the vehicle. In some embodiments, inflatable curtain cushions may cover one or more of the A-, B-, C-, and D-pillars of a vehicle. For example, in some embodiments, the inflated curtain airbag may extend from the A-pillar to the C-pillar of the vehicle. In other embodiments, a deployed inflatable curtain cushion may extend from the A-pillar to the D-pillar of the vehicle.

In a collision event, the inflatable curtain cushion may be inflated by an inflator and change conformation from being rolled and/or folded in the packaged state to being extended and/or inflated in the deployed state. In some arrangements, the amount of gas from the inflator that is retained within the inflatable curtain determines how hard or soft the cushioning of the curtain will be or how hard or soft portions of the curtain will be. Other factors may also affect the cushioning abilities of the inflatable curtain airbag.

Some inflatable curtain cushions may be configured to serve dual functions of cushioning and ejection prevention. During a collision event, the curtain may cushion the head and upper body of an occupant, and during a roll-over event, the cushion may function to help retain the occupant within the vehicle. Inflatable curtain cushions help mitigate the risk of occupant ejection by forming a barrier between the occupant and the side windows.

Some inflatable airbags have a throat portion that is in fluid communication with an inflator. The inflator may be configured to generate inflation gas in response to predetermined conditions. The inflatable airbag may include one or more voids or chambers for receiving the inflation gas. A gas guide may be positioned in the void of the inflatable airbag at or adjacent the throat portion. In some instances the gas guide may extend beyond the throat portion. Gas guides of any dimensions and disposed at any position within the void of the throat portion and/or the inflatable airbag are within the scope of this disclosure. A gas guide may be a textile gas guide constructed or made from a textile material, which may include, but is not limited to, coated, uncoated, woven, unwoven, synthetic, or natural fabric, film, or other suitable fabric or fabric-like material.

In some embodiments, the gas guide may be made of the same material as the throat portion and/or the inflatable cushion. In other embodiments, the gas guide may be made of a different material than the throat portion and/or the inflatable cushion. The materials may have different strengths, melting temperatures, and/or other relevant properties.

In some embodiments, the gas guides disclosed herein may deliver or guide inflation gas, or be configured to deliver or guide inflation gas, in a controlled or delayed manner from the inflator into one or more chambers or segments of the airbag. Such controlled or delayed direction of the inflation gas into the inflatable cushion segments may soften the deployment of the inflatable airbag and/or the cushioning provided by the deployed inflatable airbag. Inflatable curtain airbags with varying timing of inflation of different portions or segments of the airbag may be desirable. Likewise, inflatable curtain airbags with varying levels of hardness in different portions or segments of the airbag during deployment and/or upon deployment may also be desirable.

As used herein, the terms "proximal" and "distal" refer to proximity to the inflator and/or direction of inflation gas flow during deployment, where more proximally oriented features are closer to the inflator and/or contact inflation gases sooner than do more distally oriented features.

As used herein, the term "vehicle occupant position" refers to a position typically occupied by a vehicle occupant seated in a vehicle seat.

As used herein, the term "out of position" refers to a position (i.e., of a vehicle occupant) that is atypical or that is at least partially outside of the vehicle occupant position. For example, in relation to an inflatable curtain airbag, an out of position vehicle occupant may have his or her head positioned below a packaged inflatable curtain airbag and in-line with a deployment path and/or deployment direction of the curtain airbag. For example, an out of position occupant's head may be disposed below a position along a roof rail from where the inflatable curtain airbag deploys. In another example, an out of position vehicle occupant may have his or her head positioned at or adjacent a side window of a vehicle. For example, in certain situations, a head of an out of position vehicle occupant may be spaced a distance from a window.

When a vehicle occupant is out of position, an inflatable curtain airbag may strike the head or another portion of the vehicle occupant upon deployment of the inflatable curtain airbag (i.e., during a collision event). Striking of the head by a deploying inflatable curtain airbag may cause or result in head and/or neck injuries to the vehicle occupant. For example, a deploying or inflating inflatable curtain airbag may collide with or strike the head of a vehicle occupant and cause or result in a neck compression injury. The head may deflect the inflating airbag cushion to a space on either side of the head (e.g., outboard of the head, toward the window, or inboard of the head), but the deflection contact may still result in injury to the vehicle occupant. Certain embodiments of the inflatable curtain airbag assemblies of the present disclosure may be configured such that head and/or neck injuries are avoided or limited.

Figure 1A:
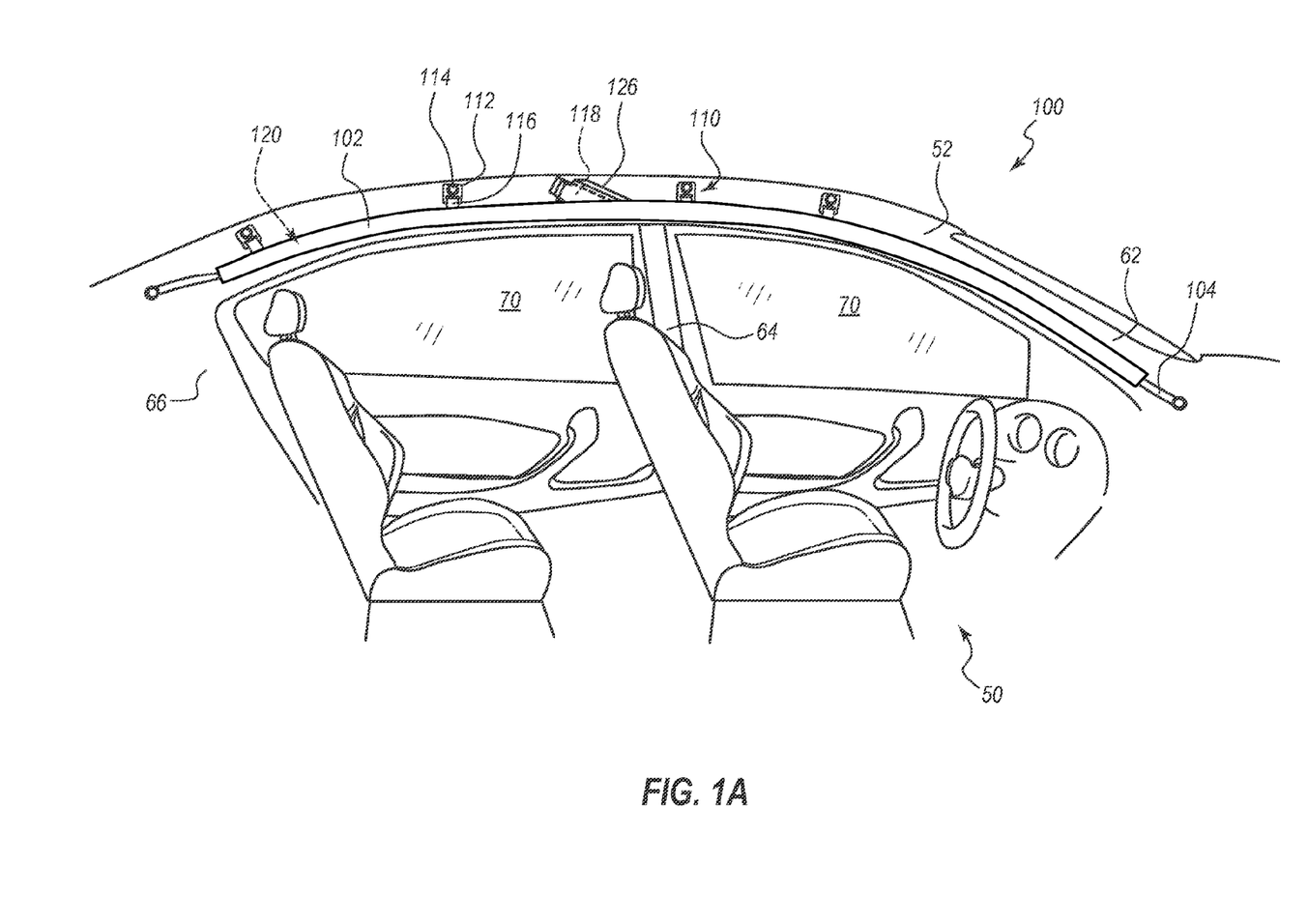
FIG. 1A is a side elevation view of an airbag assembly, according to one embodiment of the present disclosure, in a packaged state within a vehicle.
Figure 1B:
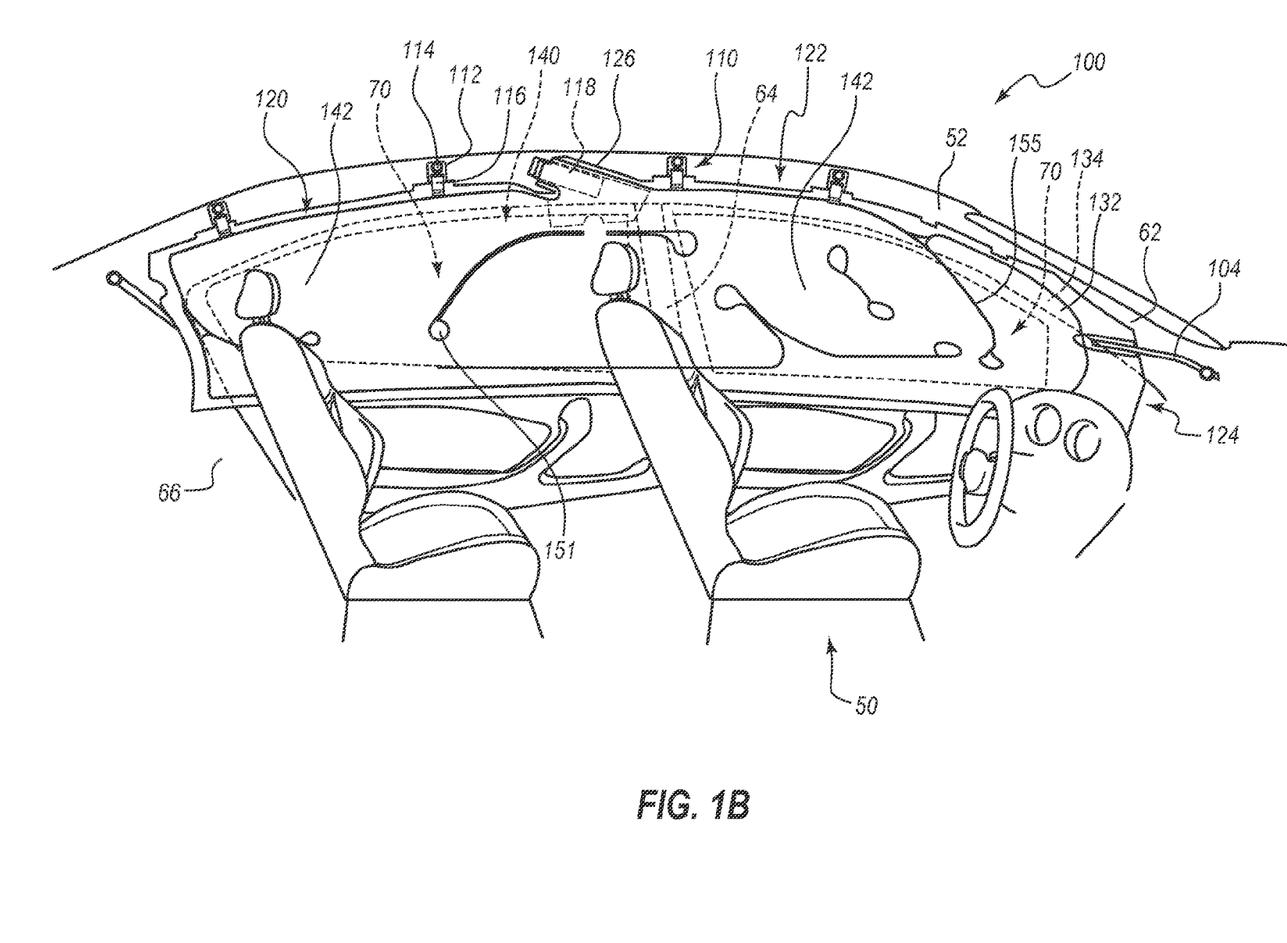
FIG. 1B is a side elevation view of the airbag assembly of FIG. 1A in a deployed state.

FIGS. 1A and 1B depict an embodiment of an inflatable curtain airbag assembly 100 mounted within a vehicle 50. In FIG. 1A, the assembly 100 is in a packaged configuration, whereas in FIG. 1B, the assembly 100 is in a deployed configuration.

The assembly 100 can include an inflatable curtain airbag 120, which can be secured to the vehicle 50 in any suitable manner. The inflatable curtain airbag 120 may also be referred to herein as a cushion or as an airbag. In the illustrated embodiment of FIG. 1A, the inflatable curtain airbag 120 is positioned at an interior of a restraint 102 so as to be retained in a packaged configuration. The restraint 102 may be of any suitable variety, such as one or more straps, tethers, socks, or sleeves. In the illustrated embodiment, the restraint 102 includes a sleeve that extends along substantially a full length of the inflatable curtain airbag 120, such that a majority of the inflatable curtain airbag 120 is obscured from view by the sleeve.

As stated above, the assembly 100 can be attached to the vehicle 50 in any suitable manner. For example, in some embodiments, the assembly 100 includes one or more fastening assemblies 110 that are configured to secure one or more of the inflatable curtain airbag 120 and the restraint 102 to the vehicle 50. The assembly 100 can be mounted inside the vehicle 50 adjacent to a roof of the vehicle, such as to a roof rail 52. In the illustrated embodiment, each fastening assembly 110 includes a tether or strap 116 that is secured to mounting hardware, such as a tab 112 that is secured to the roof rail 52 via a fastener 114, such as a bolt. Each strap 116 may be coupled with one or more of the inflatable curtain airbag 120 and the restraint 102 in any suitable manner. Any other suitable fastening arrangement is also within the scope of this disclosure.

A forward end of the assembly 100 can include a strap 104, which may be secured to the vehicle in any suitable manner. For example, in the illustrated embodiment, the strap 104 is attached to a lower end of an A-pillar 62. As shown in FIG. 1B, the strap 104 can be attached to a forward end 124 of the inflatable curtain airbag 120. An upper end 122 of the inflatable curtain airbag 120 can be attached to the straps 116. In some embodiments, the straps 116 are sewn to the inflatable curtain airbag 120. In other embodiments, the straps 116 may be integrally formed with the inflatable curtain airbag 120, and may extend from one or more panels of the inflatable cushion 120.

With reference to FIGS. 1A and 1B, the assembly 100 can further include an inflator 118, which may be positioned within and/or coupled to a throat portion 126 of the inflatable curtain airbag 120. The inflator 118 can be anchored to the roof rail 52, and may be of any suitable variety. As depicted, the inflator 118 is anchored to the vehicle 50 rearward of a B-pillar 64 forming a "mid-fill" configuration. In some embodiments, an inflator may be anchored to the vehicle 50 adjacent the A-pillar 62 or adjacent a C-pillar 66 forming an "end-fill" configuration. The inflator 118 can include any typical inflator device, including either a pyrotechnic device or a stored gas inflator. The inflator 118 may also include a single-stage inflator and/or a multiple stage inflator. In certain embodiments, the inflator 118 can be in electronic communication with vehicle sensors which are configured to detect vehicle collisions and/or rollovers. Upon detection of predetermined conditions, the sensors can activate the inflator 118 and the inflatable curtain airbag 120 may be inflated or rapidly inflated. Other configurations of the inflator 118 are also within the scope of this disclosure.

With continued reference to FIGS. 1A and 1B, the inflatable curtain airbag 120 can be configured to cover various structures of the vehicle 50 when deployed. For example, in some embodiments, at least a portion of the deployed inflatable curtain airbag 120 can cover one or more of the A-pillar 62, the B-pillar 64, and the C-pillar 66, and/or one or more side windows 70. The illustrated embodiment is configured to cover at least a portion of the B-pillar 64 and at least portions of each of the side windows 70.

With reference to FIG. 1B, the inflatable curtain airbag 120 can define various portions that direct or guide inflation gas during deployment of the inflatable curtain airbag 120 and/or that provide different amounts of cushioning relative to the vehicle structures upon deployment of the inflatable curtain airbag 120. In particular, the inflatable curtain airbag 120 can include various inflatable chambers, cells, or cushion segments that are configured to be filled with inflation gases in order to cushion a vehicle occupant during a collision event. The illustrated embodiment includes a plurality of inflatable cushion segments 142 that are in fluid communication with an inflation gas delivery channel 140. The inflatable cushion segments 142 can be configured to deploy at strategic areas at which a vehicle occupant may benefit most from the cushioning.

In some embodiments, the inflatable curtain airbag 120 can include one or more non-inflatable regions 151, one or more of which may be positioned between adjacent inflatable cushion segments 142 or at an interior of an inflatable cushion segment 142 (e.g., so as to be encompassed by an inflatable cushion segment 142).

In various embodiments, at least a portion of one or more of the inflatable cushion segments 142 and the non-inflatable regions 151 can be defined by one or more boundary seams 155. The one or more boundary seams 155 may be formed in any suitable manner. For example, in some embodiments, the one or more boundary seams 155 may include one or more of stitches, welds (e.g., radiofrequency welds), and/or adhesives. In other or further embodiments, the boundary seams 155 may be woven portions that are formed via one-piece weaving techniques. As further discussed below, in some embodiments, the boundary seams 155 may join together two or more pieces of fabric, such as a front face 132 and a rear face 134. In some embodiments, the one or more boundary seams 155 are substantially airtight so as to be able to retain inflation gas within a given inflatable cushion segment 142. The one or more boundary seams 155 can be said to fluidly isolate adjacent inflatable cushion segments 142 from each other. In other embodiments, the one or more boundary seams 155 may not be airtight, but may instead resist egress of gases from an inflatable cushion segment 142.

The shapes of the inflatable curtain airbag 120 and its various components, such as the segments 142, that are depicted in FIG. 1B are not necessarily limiting. These shapes may be altered, such as to accommodate differently shaped vehicles. In some embodiments, the deployed or inflated inflatable curtain airbag 120 is configured to fit within the side window wells of vehicle 50. The inflatable curtain airbag 120 may include a contiguous piece of material manufactured using a one-piece woven technique, in some embodiments, or in other or further embodiments, may be manufactured by cutting and sewing separate pieces of material (e.g., nylon fabric) together. For example, the front and rear faces 132, 134 may be formed from separate sheets of material that are joined together. In other embodiments, the front and rear faces 132, 134 may be formed from a unitary piece of material.

As can be appreciated from FIGS. 1A and 1B, when the inflatable curtain airbag 120 is in the packaged configuration, all components of the inflatable curtain airbag 120 can be at an interior of the restraint 102. In the illustrated embodiment, the restraint 102 is a sleeve that covers an entirety of the inflatable curtain airbag 120. However, in other embodiments, the restraint 102 may merely include a plurality of straps, and each strap may encompass a portion of various components of the inflatable curtain airbag 120, such as, for example, portions of the inflation gas delivery channel 140.

Figure 1C:
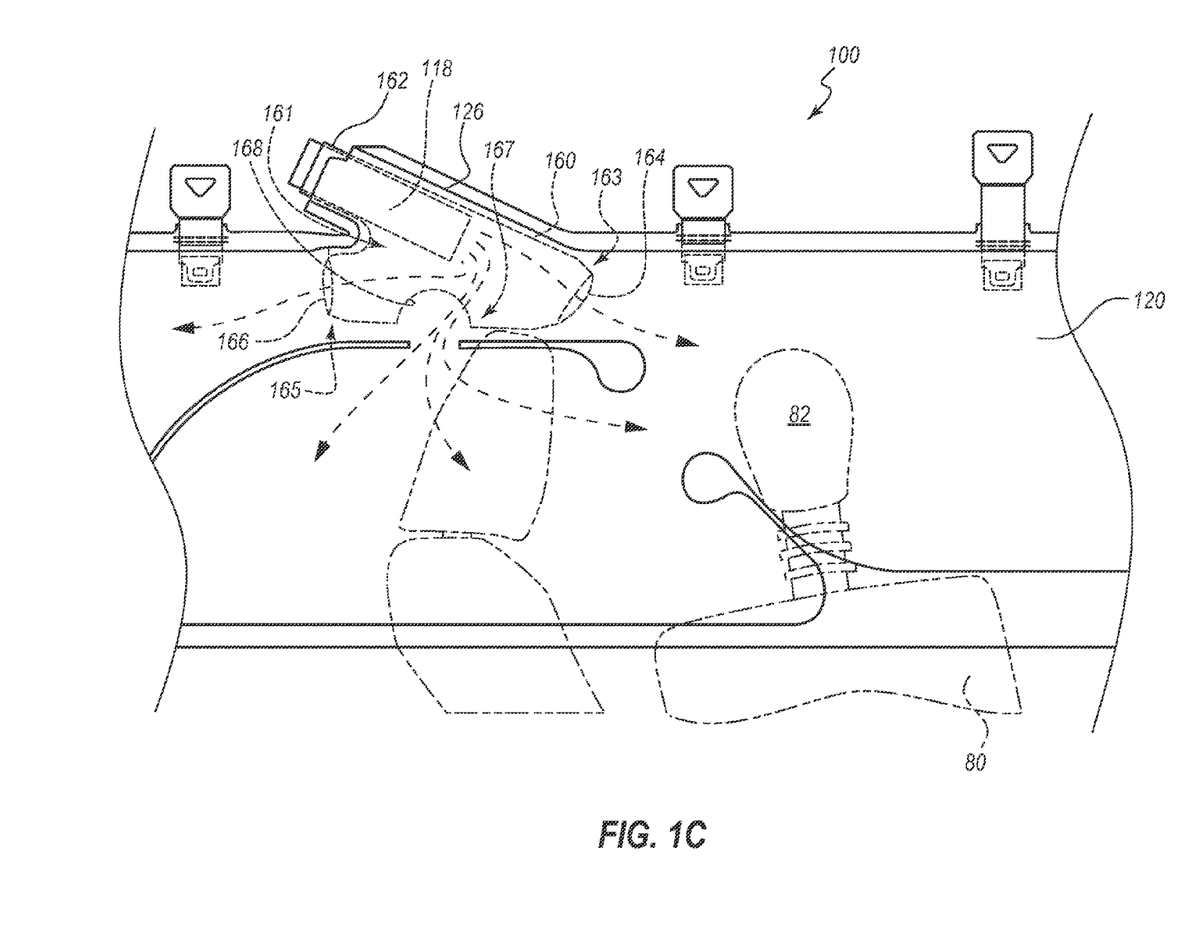
FIG. 1C is a detail view of a portion of the airbag assembly of FIG. 1B.

FIG. 1C is a detail view of a portion of the inflatable curtain airbag assembly 100 of FIG. 1B. As depicted, the assembly 100 can include an inflator 118 and an inflatable curtain airbag 120. The inflatable curtain airbag 120 can be in fluid communication with the inflator 118 at a throat portion 126. Further, a gas guide 160 can be disposed within at least a portion of the throat portion 126. The gas guide 160 may be in fluid communication with the inflator 118. As depicted, the gas guide 160 can include a first opening 162 or inflator opening, wherein the first opening 162 can be in fluid communication with the inflator 118. Further, the gas guide 160 can include a forward opening 164 disposed in a forward portion 163 of the gas guide 160. At a position opposite the forward portion 163 (i.e., a rearward portion 165 of the gas guide 160) the gas guide 160 can also include a rearward opening 166. The gas guide 160 can also include a downward opening 168 disposed in a lower portion 167 of the gas guide 160. In the illustrated embodiment, the downward opening 168 is positioned between each of the forward opening 164 and the rearward opening 166. Other configurations of the first opening 162, the forward opening 164, the rearward opening 166, and/or the downward opening 168 are also within the scope of the present disclosure.

The downward opening 168 can be configured to allow or permit flow of inflation gas from within a void 161 of the gas guide 160 downward into the inflatable curtain airbag 120. A size of the downward opening 168 can be greater than either the size of the forward opening 164 or the size of the rearward opening 166. For example, the size of the downward opening 168 may be at least twice the size of the forward opening 164 or the size of the rearward opening 166. In various embodiments, the size of the downward opening 168 may be at least three times, four times, five times, etc. the size of the forward opening 164 or the size of the rearward opening 166. In certain embodiments, the size of the downward opening 168 may be larger than the size of both the forward opening 164 and rearward opening 166 combined. As used herein, "size" refers to any manner of measurement or quantification of an opening, including but not limited to a measurement of one or more dimension (circumference, perimeter, diameter, area), venting capacity, French gauge, and the like. Directional terms, such as "forward," "downward," "lower," etc., are used herein with respect to the orientation shown in FIGS. 1A-4. The terms are used for the sake of convenience and are not necessarily intended to be limiting.

Upon deployment of the inflatable curtain airbag 120, the gas guide 160 can deliver or guide the inflation gas into various portions of the inflatable curtain airbag 120. As illustrated, due at least in part to the greater size of the downward opening 168 in relation to the sizes of the forward opening 164 and the rearward opening 166, a greater portion or a majority of the inflation gas, as indicated by the multiple dashed arrows, is delivered through the downward opening 168 of the gas guide 160 and into a lower portion of the inflatable curtain airbag 120. A lesser portion of the inflation gas in relation to the portion of the inflation gas delivered through the downward opening 168, as indicated by the single dashed arrow, may be delivered through the forward opening 164 and into a forward portion of the inflatable curtain airbag 120. Likewise, a lesser portion of the inflation gas in relation to the portion of the inflation gas delivered through the downward opening 168, as indicated by the single dashed arrow, may be delivered through the rearward opening 166 and into a rearward portion of the inflatable curtain airbag 120.

Furthermore, the position of the downward opening 168 (i.e., rearward of a head 82 of a vehicle occupant 80) can deliver or guide the inflation gas to a portion of the inflatable curtain airbag 120 that is away from or distal to the head 82 of the vehicle occupant 80. Such a configuration may limit or prevent potential injuries to an out of position vehicle occupant 80 upon deployment of the inflatable curtain airbag 120. For example, if a majority of or a greater portion of the inflation gas is delivered to a portion of the inflatable curtain airbag 120 at or adjacent a position of the head 82, or another portion, of the out of position vehicle occupant 80, the vehicle occupant 80 may be injured (i.e., the vehicle occupant 80 may receive a head injury, a neck compression injury, or another type of injury). In certain embodiments, the downward opening 168 may be disposed at another position within the inflatable curtain airbag 120 (e.g., forward of the head 82 of the vehicle occupant 80) such that head, neck, or other injuries to an out of position vehicle occupant 80 are also avoided or limited.

Figure 2:
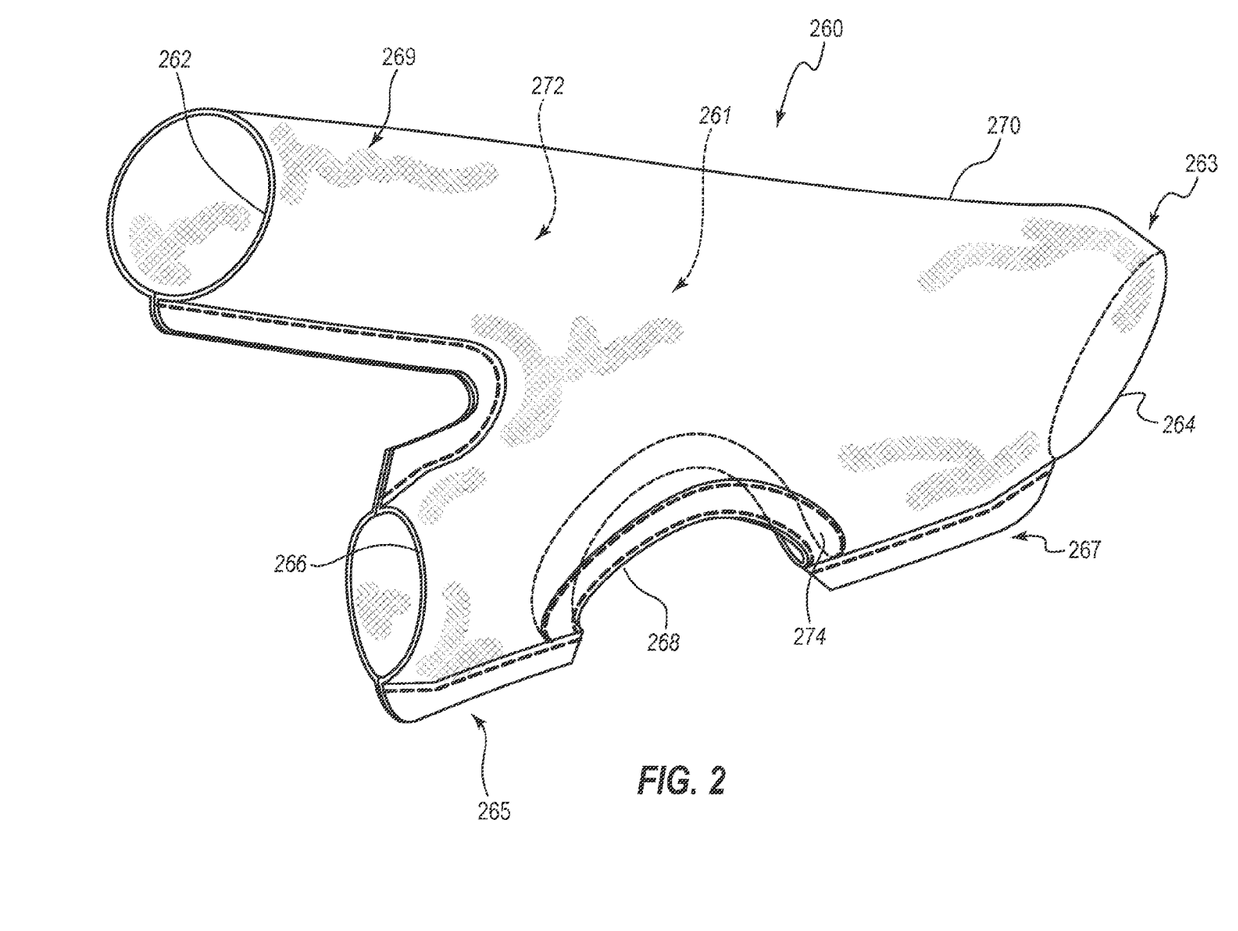
FIG. 2 is a perspective view of a gas guide, according to one embodiment of the present disclosure.

FIG. 2 is a perspective view of a gas guide 260 that can resemble the gas guide 160 described above in certain respects. Accordingly, like features are designated with like reference numerals, with the leading digits incremented to "2." Relevant disclosure set forth above regarding similarly identified features thus may not be repeated hereafter. Moreover, specific features of the gas guide 260 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the gas guide 260. Any suitable combination of the features and variations of the same described with respect to the gas guide 160 can be employed with the gas guide 260, and vice versa. This pattern of disclosure applies equally to further embodiments depicted in subsequent figures and described hereafter, wherein the leading digits may be further incremented.

The gas guide 260 can be configured to deliver inflation gas into an inflatable cushion, such as an inflatable curtain airbag. For example, the gas guide 260 may deliver or guide inflation gas from an inflator into various portions of an inflatable curtain airbag (e.g., a forward portion and/or a rearward portion of an inflatable curtain airbag). The gas guide 260 can include a guide sleeve 270. The guide sleeve 270 can be formed of one or more panels to define a void 261 configured to receive inflation gas from an inflator. The gas guide 260 can further include a first opening 262 or inflator opening, wherein the first opening 262 fluidly couples, or is configured to fluidly couple, the void 261 of the guide sleeve 270 to an inflator. The first opening 262 can be disposed or positioned in an upper portion 269 of the guide sleeve 270. In some embodiments, the first opening 262 can be disposed in another suitable portion of the guide sleeve 270.

The gas guide 260 can also include a forward opening 264, wherein the forward opening 264 is disposed or positioned in a forward portion 263 of the guide sleeve 270. The forward opening 264 can deliver or guide inflation gas, or be configured to deliver or guide inflation gas, from the void 261 into a forward portion of an inflatable cushion. The gas guide 260 can also include a rearward opening 266, wherein the rearward opening 266 is disposed or positioned in a rearward portion 265 of the guide sleeve 270. The rearward opening 266 can guide or deliver inflation gas, or be configured to deliver or guide inflation gas, from the void 261 into a rearward portion of an inflatable cushion. The gas guide 260 can further include a downward opening 268, wherein the downward opening 268 is disposed or positioned in a lower portion 267 of the guide sleeve 270. The downward opening 268 can deliver or guide inflation gas, or be configured to deliver or guide inflation gas, from the void 261 downward into a lower portion of an inflatable cushion.

In certain embodiments, an area of the downward opening 268 is at least two times greater than an area of the forward opening 264 and/or an area of the rearward opening 266. In certain other embodiments, the area of the downward opening 268 is at least three times greater than the area of the forward opening 264 and/or the area of the rearward opening 266. In certain other embodiments, the area of the downward opening 268 is at least four times greater than the area of the forward opening 264 and/or the area of the rearward opening 266. In certain other embodiments, the area of the downward opening 268 is at least five times greater than the area of the forward opening 264 and/or the area of the rearward opening 266. The area of the downward opening 268 can also be more than five time greater than the areas of the forward opening 264 and/or the rearward opening 266.

In various embodiments, the downward opening 268 is configured such that a volumetric flow rate of inflation gas through the downward opening 268 is at least two times a volumetric flow rate of inflation gas through the forward opening 264 and/or a volumetric flow rate of inflation gas through the rearward opening 266. In various other embodiments, the downward opening 268 is configured such that a volumetric flow rate of inflation gas through the downward opening 268 is at least three times a volumetric flow rate of inflation gas through the forward opening 264 and/or a volumetric flow rate of inflation gas through the rearward opening 266. In various embodiments, the downward opening 268 is configured such that a volumetric flow rate of inflation gas through the downward opening 268 is at least four times a volumetric flow rate of inflation gas through the forward opening 264 and/or a volumetric flow rate of inflation gas through the rearward opening 266. In various embodiments, the downward opening 268 is configured such that a volumetric flow rate of inflation gas through the downward opening 268 is at least five times a volumetric flow rate of inflation gas through the forward opening 264 and/or a volumetric flow rate of inflation gas through the rearward opening 266. Other suitable volumetric flow rates of inflation gas through the downward opening 268 in relation to the volumetric flow rates through the forward opening 264 and/or the rearward opening 266 are also within the scope of this disclosure.

Stated otherwise, a size of the downward opening 268 may be larger (e.g., by two, three, four, five, etc, times) than a size of both the forward opening 264 and rearward opening 266.

In some embodiments, a first portion of the inflation gas generated by the an inflator (e.g., inflator 118, of FIG. 1A) may be delivered or guided through the downward opening 268, a second portion of the inflation gas may be delivered or guided through the forward opening 264, and a third portion of the inflation gas may be delivered or guided through the rearward opening 266. In some embodiments, the volume of the first portion of the inflation gas may be two times, three times, four times, five times, or more times greater than the volume of the second portion of the inflation gas and/or the volume of the third portion of the inflation gas.

With continued reference to FIG. 2, the guide sleeve 270 can form at least a portion of the void 261 as an inflation gas distribution channel 272, wherein the inflation gas distribution channel 272 is substantially "Y" shaped, and wherein the inflation gas distribution channel 272 extends between each of the first opening 262, the forward opening 264, and the rearward opening 266. In some other embodiments, the inflation gas distribution channel 272 may be substantially "T" shaped. The inflation gas distribution channel 272 may also be another suitable shape.

In some embodiments, the distance between the first opening 262 and the downward opening 268 via the inflation gas distribution channel 272 is less than the distance between the first opening 262 and the forward opening 264 via the inflation gas distribution channel 272 and/or is less than the distance between the first opening 262 and the rearward opening 266 via the inflation gas distribution channel 272. The distances between the first opening 262 and each of the downward opening 268, the forward opening 264, and/or the rearward opening 266 via the inflation gas distribution channel 272 may also be other suitable distances.

In some embodiments, the downward opening 268 can be positioned forward of the first opening 262. In some other embodiments, the downward opening 268 can be positioned rearward of the first opening 262. In yet some other embodiments, the downward opening 268 can be disposed at a position that is substantially below the first opening 262 (i.e., along a vertical axis).

In the illustrated embodiment of FIG. 2, the downward opening 268 is substantially circular. Likewise, each of the first opening 262, the forward opening 264, and the rearward opening 266 can be substantially circular. In other embodiments, one or more of the first opening 262, the forward opening 264, the rearward opening 266, and the downward opening 268 can be substantially oval, substantially square, or substantially triangular. Any other suitable shape can also be used. For example, the shape of one or more of the first opening 262, the forward opening 264, the rearward opening 266, and the downward opening 268 can be irregular (i.e., not a traditionally defined shape). At least a portion of the guide sleeve 270 at or adjacent the downward opening 268 can also be reinforced. Likewise, one or more of the first opening 262, the forward opening 264, and the rearward opening 266 can also be reinforced. For example, as illustrated, a substantially annular panel 274 can be coupled to the guide sleeve 270 at or adjacent the downward opening 268. In various embodiments, the substantially annular panel 274 can be stitchingly coupled to the guide sleeve 270. One or more of the first opening 262, the forward opening 264, the rearward opening 266, and the downward opening 268 can be reinforced by stitching, a plurality of seams, or other suitable mechanisms.

Figure 3:
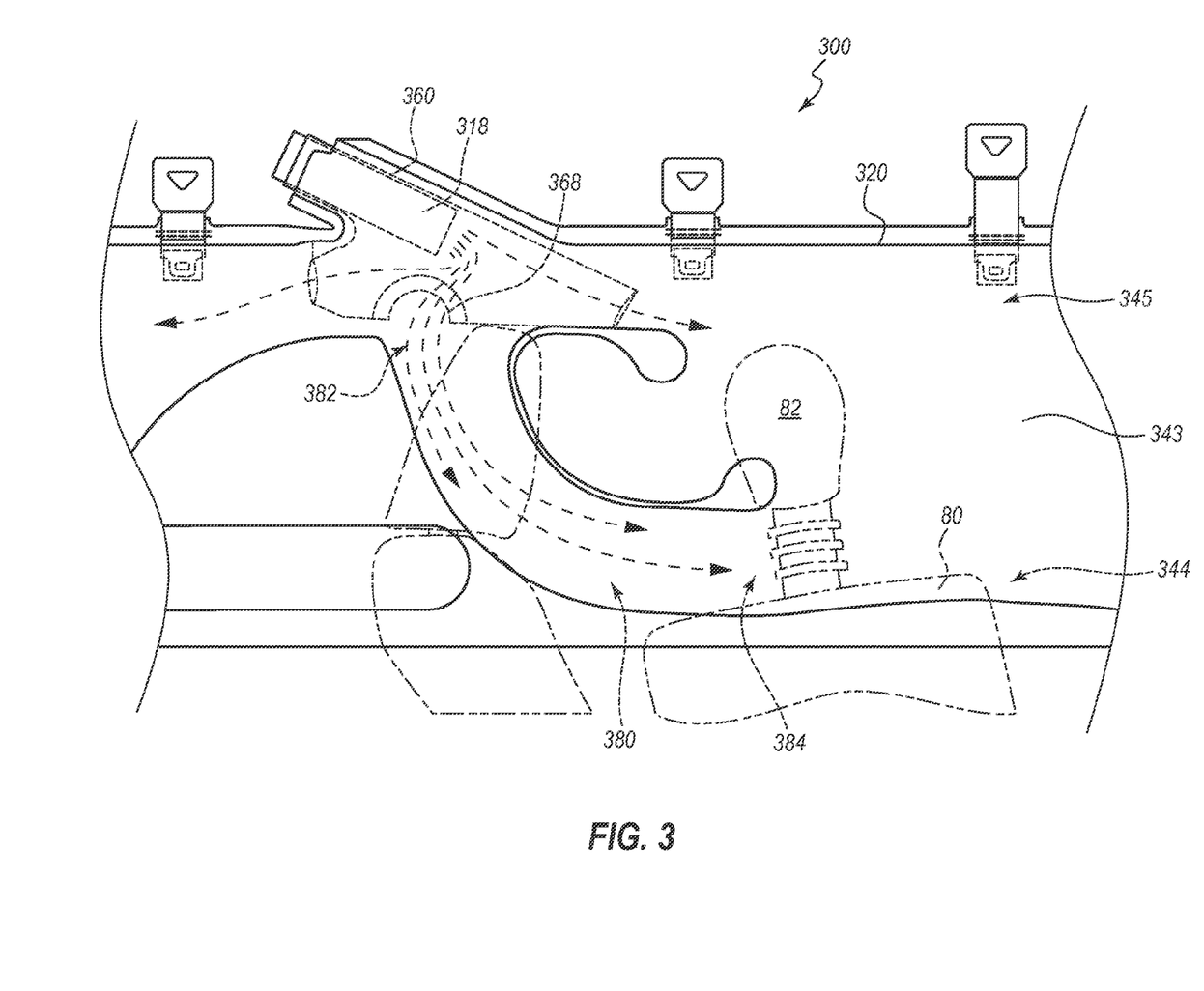
FIG. 3 is a detail view of a portion of an airbag assembly, according to another embodiment of the present disclosure, in a deployed state within a vehicle.

FIG. 3 is a detail view of another embodiment of an inflatable curtain airbag assembly 300 of the present disclosure. In the illustrated embodiment, an inflatable curtain airbag 320 includes a first inflatable cushion segment 343. As illustrated, a downward opening 368 can be configured to deliver or guide inflation gas downward into the first inflatable cushion segment 343, toward a lower portion 344 of the first inflatable cushion segment 343 such that the lower portion 344 of the first inflatable cushion segment 343 is configured to inflate more quickly or more rapidly than an upper portion 345 of the first inflatable cushion segment 343. Also, as discussed above, a greater portion of the inflation gas is directed downward at a position away from (e.g., distal to) a top of the head 82 of the vehicle occupant 80.

With continued reference to FIG. 3, when the inflatable curtain airbag 320 is in a deployed or inflated configuration, as illustrated, the lower portion 344 of the first inflatable cushion segment 343 is disposed at a position below the head 82 of the vehicle occupant 80 when the vehicle occupant 80 is seated in a vehicle occupant position.

The position of portions of the inflatable curtain airbag 320 (e.g., the lower portion 344 of the first inflatable cushion segment 343) may be described with greater specificity by reference to a crash test dummy, such as the THOR Advanced Crash Test Dummy (THOR crash test dummy), the Hybrid III Fiftieth Percentile Male Crash Test Dummy (Hybrid III crash test dummy), or another crash test dummy designed consistent with specifications set forth by the NHTSA or similar regulatory and/or governing organization. The specifications of the two aforementioned crash test dummies are set forth in the THOR-NT User's Manual (Revision 2005.1, March 2005) and the User's Manual for the 50th Percentile Male Hybrid III Test Dummy (June 1998, Reaffirmed April 2005). In some embodiments disclosed herein, the lower portion 344 of the first inflatable cushion segment 343 can be disposed below a head of a crash test dummy that is seated in a driver seat in a vehicle occupant position.

The inflatable curtain airbag 320 can further include an elongate channel 380. The elongate channel 380 may be in fluid communication with the downward opening 368 of a gas guide 360. A proximal end 382 of the elongate channel 380 is disposed at or adjacent the downward opening 368 such that the elongate channel 380 may receive inflation gas from the inflator 318. Further, a distal end 384 of the elongate channel 380 is positioned forward in relation to the downward opening 368 and within the lower portion 344 of the first inflatable cushion segment 343. As illustrated, the distal end 384 of the elongate channel 380 can be positioned lower than a portion of the inflatable curtain airbag 320 configured to receive the head 82 of the vehicle occupant 80.

In some embodiments, the elongate channel 380 may be stitchingly coupled to one or more interior surfaces of the inflatable curtain airbag 320. In other embodiments the elongate channel 380 may be coupled to the inflatable curtain airbag 320 by adhesive, stitching, taping, radiofrequency welding, heat sealing, hook and loop fasteners, and/or any other suitable technique or combination of techniques. Also, as illustrated, the elongate channel 380 can be configured to deliver inflation gas to a forward portion of the lower portion 344 of the first inflatable cushion segment 343. In certain embodiments, the inflatable curtain airbag 320 may only include a single inflatable cushion segment. In such embodiments, the elongate channel 380 may be configured to deliver inflation gas to a forward portion of a lower portion 344 of the inflatable curtain airbag 320.

With continued reference to FIG. 3, the downward opening 368 can be disposed rearward of the head 82 of the vehicle occupant 80 when the vehicle occupant 80 is seated in a vehicle occupant position. In some embodiments, the downward opening 368 can be disposed forward of the head 82 of the vehicle occupant 80 when the vehicle occupant 80 is seated or disposed in a vehicle occupant position. Other suitable arrangements are possible that allow the downward opening 368 to direct inflation gas downward, to a lower portion 344 of the inflatable curtain airbag 320, at a position other than on top of, or otherwise toward a top of, the head 82 of an out of position vehicle occupant 80 whose head 82 is in line with a deployment path of the inflatable curtain airbag 320. In this manner, the downward opening 368 can reduce or limit neck compression, head and/or neck injury, or other related injuries, particularly to an out of position vehicle occupant 80, during deployment of the inflatable curtain airbag 320.

Figure 4:
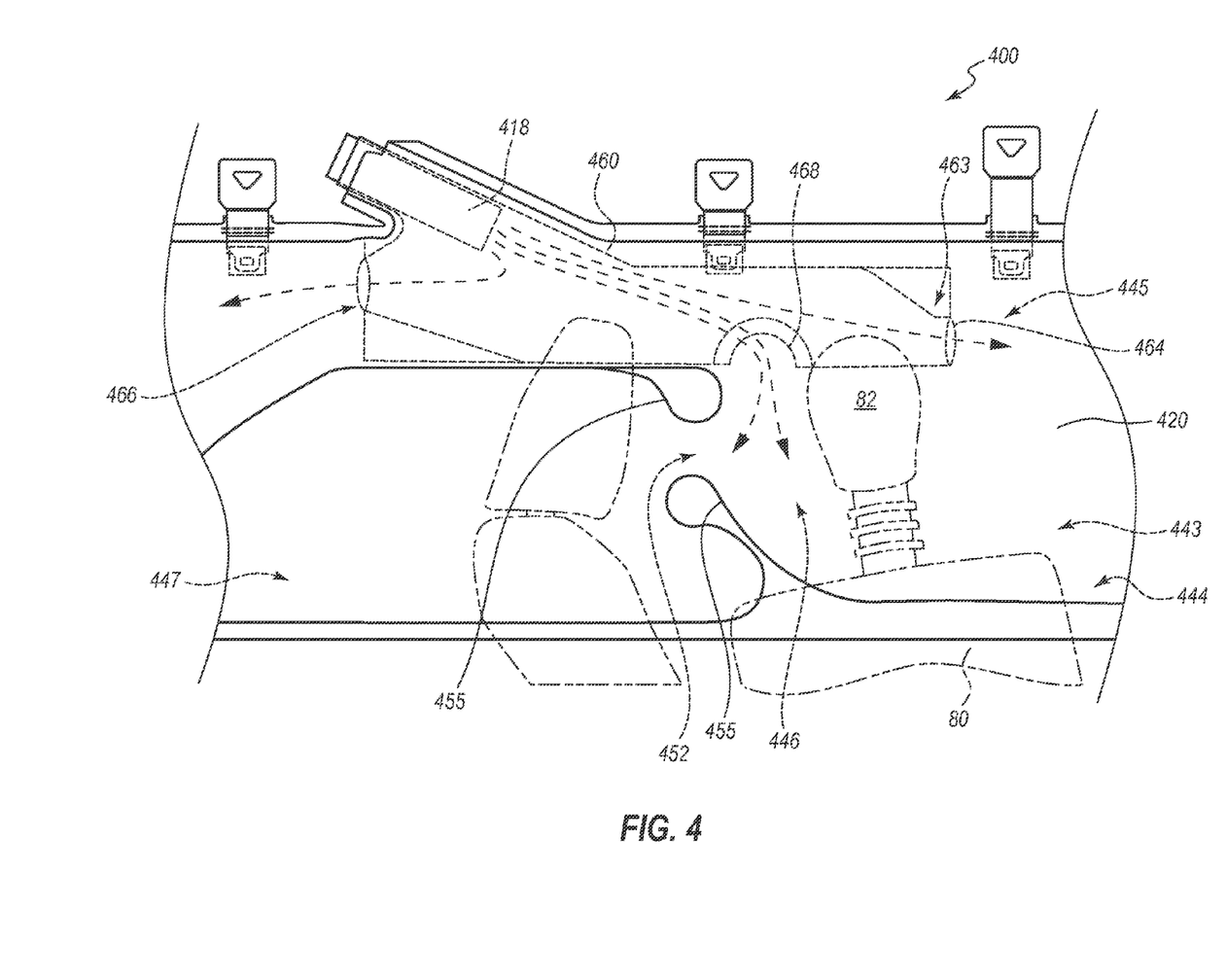
FIG. 4 is a detail view of a portion of an airbag assembly, according to yet another embodiment of the present disclosure, in a deployed state within a vehicle.

FIG. 4 is a detail view of another embodiment of an inflatable curtain airbag assembly 400 of the present disclosure. In the illustrated embodiment, an inflatable curtain airbag 420 includes a first inflatable cushion segment 443. As illustrated, a downward opening 468 can be configured to deliver or guide inflation gas downward into the first inflatable cushion segment 443 toward a lower portion 444 of the first inflatable cushion segment 443 such that the lower portion 444 of the first inflatable cushion segment 443 is configured to inflate more quickly or more rapidly than an upper portion 445 of the first inflatable cushion segment 443.

With continued reference to FIG. 4, when the inflatable curtain airbag 420 is in a deployed or inflated configuration, the lower portion 444 of the first inflatable cushion segment 443 is disposed below the head 82 of the vehicle occupant 80 when the vehicle occupant is seated in a vehicle occupant position. As illustrated, a forward portion 463 of a gas guide 460 can extend longitudinally from an inflator 418 toward a forward portion of the inflatable curtain airbag 420 such that a forward opening 464 is disposed forward relative to the head 82 of the vehicle occupant 80 when the vehicle occupant 80 is disposed or seated in a vehicle occupant position.

As depicted in FIG. 4, the inflatable curtain airbag 420 can further include a second inflatable cushion segment 447, wherein the second inflatable cushion segment 447 is disposed rearward of the first inflatable cushion segment 443. The downward opening 468 can be configured to deliver inflation gas into the first inflatable cushion segment 443 downward toward the lower portion 444 of the first inflatable cushion segment 443. Further, at least a portion of a rearward portion 446 of the first inflatable cushion segment 443 is defined by a seam 455, wherein the seam 455 is configured to deliver inflation gas flowing from the downward opening 468 toward a forward portion of the lower portion 444 of the first inflatable cushion segment 443. As depicted, at least a portion of the seam 455 can be curved or otherwise shaped such that the seam 455 may deliver the inflation gas from at least the downward opening 468 toward the lower portion 444 and the forward portion of the lower portion 444 of the first inflatable cushion segment 443.

In certain embodiments, as depicted, the rearward opening 466 can be in fluid communication with the second inflatable cushion segment 447. The second inflatable cushion segment 447 can be in fluid communication with the first inflatable cushion segment 443. For example, the first inflatable cushion segment 443 and the second inflatable cushion segment 447 can be in fluid communication via an aperture, opening, or slit 452 disposed in the seam 455. In some embodiments, the first inflatable cushion segment 443 and the second inflatable cushion segment 447 may be in fluid communication with each other. Various arrangements of inflatable cushion segments within the inflatable curtain airbag 420 are within the scope of this disclosure.

As discussed above, inflatable curtain airbags of the present disclosure may be configured such that neck compression, head and/or neck injury, or other related injuries to a vehicle occupant are limited or reduced during deployment of the inflatable curtain airbags. In certain embodiments, the inflatable curtain airbags of the present disclosure may also be configured such that neck compression, head and/or neck injury, or other related injuries to an out of position vehicle occupant are limited or reduced during deployment of the inflatable curtain airbags.

Much of the foregoing disclosure has focused on side curtain airbags configured to deploy lateral of a driver and/or a passenger seated in a front seat of a vehicle, or a passenger seated in a rear bench or seat of a vehicle. It should be understood that airbag features disclosed herein may be used with other types of airbags, as previously mentioned.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. A gas guide for directing inflation gas within an inflatable cushion, the gas guide comprising:
    a guide sleeve formed of one or more panels to define a void configured to receive inflation gas from an inflator;
    an inflator opening into the guide sleeve configured to fluidly couple the void of the guide sleeve to an inflator,
    a forward opening positioned in a forward portion of the guide sleeve, wherein the forward opening is configured to deliver inflation gas from the void into a forward portion of an inflatable cushion;
    a rearward opening positioned in a rearward portion of the guide sleeve, wherein the rearward opening is configured to deliver inflation gas from the void into a rearward portion of an inflatable cushion; and
    a downward opening positioned in a lower portion of the guide sleeve, wherein the downward opening is configured to deliver inflation gas from the void downward into a lower portion of an inflatable cushion, wherein an area of the downward opening is at least two times greater than an area of the forward opening or an area of the rearward opening.

2. The gas guide of claim 1, wherein the downward opening is configured such that a volumetric flow rate of inflation gas through the downward opening is at least two times a volumetric flow rate of inflation gas through the forward opening or a volumetric flow rate of inflation gas through the rearward opening.

3. The gas guide of claim 1, wherein the guide sleeve forms at least a portion of the void as an inflation gas distribution channel, wherein the inflation gas distribution channel is substantially "Y" shaped, and wherein the inflation gas distribution channel extends between each of the inflator opening, the forward opening, and the rearward opening.

4. The gas guide of claim 3, wherein the distance between the inflator opening and the downward opening via the inflation gas distribution channel is less than the distance between the inflator opening and the forward opening via the inflation gas distribution channel and is less than the distance between the inflator opening and the rearward opening via the inflation gas distribution channel.

5. The gas guide of claim 1, wherein the downward opening is positioned forward of the inflator opening.

6. The gas guide of claim 1, wherein the downward opening is positioned rearward of the inflator opening.

7. The gas guide of claim 1, wherein the area of the downward opening is at least three times greater than the area of the forward opening or the area of the rearward opening.

8. The gas guide of claim 1, wherein the downward opening is substantially circular.

9. The gas guide of claim 8, wherein at least a portion of the guide sleeve at or adjacent the downward opening is reinforced.

10. An inflatable curtain airbag assembly, comprising:
an inflator; and
an inflatable curtain airbag, the inflatable curtain airbag comprising:
  a throat portion in fluid communication with the inflator; and
  a gas guide in fluid communication with and disposed within at least a portion of the throat portion, wherein the gas guide comprises:
    a first opening in fluid communication with the inflator;
    a forward opening disposed in a forward portion of the gas guide;
    a rearward opening disposed in a rearward portion of the gas guide; and
    a downward opening disposed in a lower portion of the gas guide at a position between the forward opening and the rearward opening, wherein the downward opening is configured to permit flow of inflation gas from within a void of the gas guide downward into the inflatable curtain airbag, and wherein the size of the downward opening is at least twice the size of the forward opening or the size of the rearward opening.

11. The inflatable curtain airbag assembly of claim 10, wherein the inflatable curtain airbag further comprises a first inflatable cushion segment, wherein the downward opening is configured to direct inflation gas downward into the first inflatable cushion segment toward a lower portion of the first inflatable cushion segment such that the lower portion of the first inflatable cushion segment is configured to inflate more quickly than an upper portion of the first inflatable cushion segment.

12. The inflatable curtain airbag assembly of claim 11, wherein, when the inflatable curtain airbag is in a deployed configuration, the lower portion of the first inflatable cushion segment is disposed below a head of a vehicle occupant when the vehicle occupant is seated in a vehicle occupant position.

13. The inflatable curtain airbag assembly of claim 11, wherein the inflatable curtain airbag further comprises an elongate channel in fluid communication with the downward opening, wherein a proximal end of the elongate channel is disposed at or adjacent the downward opening and wherein a distal end of the elongate channel is positioned forward of the downward opening and within the lower portion of the first inflatable cushion segment.

14. The inflatable curtain airbag assembly of claim 13, wherein the distal end of the elongate channel is positioned lower than a portion of the inflatable curtain airbag configured to receive a head of a vehicle occupant.

15. The inflatable curtain airbag assembly of claim 13, wherein the elongate channel is configured to direct inflation gas to a forward portion of the lower portion of the first inflatable cushion segment.

16. The inflatable curtain airbag assembly of claim 10, wherein the downward opening is disposed rearward of a head of a vehicle occupant when the vehicle occupant is seated in a vehicle occupant position.

17. The inflatable curtain airbag assembly of claim 10, wherein the forward portion of the gas guide extends longitudinally from the inflator toward a forward portion of the inflatable curtain airbag such that the forward opening is disposed forward relative to a head of a vehicle occupant when the vehicle occupant is seated in a vehicle occupant position.

18. The inflatable curtain airbag assembly of claim 10, wherein the inflatable curtain airbag further comprises a first inflatable cushion segment and a second inflatable cushion segment, wherein the second inflatable cushion segment is disposed rearward of the first inflatable cushion segment, wherein the downward opening is configured to direct inflation gas into the first inflatable cushion segment downward toward a lower portion of the first inflatable cushion segment, wherein at least a portion of a rearward portion of the first inflatable cushion segment is defined by a seam, and wherein the seam is configured to direct inflation gas flowing from the downward opening toward a forward portion of the lower portion of the first inflatable cushion segment.

19. The inflatable curtain airbag assembly of claim 18, wherein the rearward opening is in fluid communication with the second inflatable cushion segment, and wherein the first inflatable cushion segment and the second inflatable cushion segment are in fluid communication via an aperture disposed in the seam.

20. The inflatable curtain airbag assembly of claim 18, wherein the seam is curved.

21. The inflatable curtain airbag assembly of claim 10, wherein the inflatable curtain airbag is configured to limit neck compression to an out of position vehicle occupant during deployment of the inflatable curtain airbag.

22. The inflatable curtain airbag assembly of claim 10, wherein the distance from a distal end of the inflator to the downward opening is less than the distance from the distal end of the inflator to the forward opening or the distance from the distal end of the inflator to the rearward opening.

23. The inflatable curtain airbag assembly of claim 10, wherein the size of the downward opening is at least three times the size of the forward opening or the size of the rearward opening.

* * * * *